(12) United States Patent
Stoeckl et al.

(10) Patent No.: US 8,061,953 B2
(45) Date of Patent: Nov. 22, 2011

(54) LOADING FLOOR FOR A CARGO SPACE OF A VEHICLE

(75) Inventors: Siegfried Stoeckl, Pfeffenhausen (DE); Faris Ahmed, Simpsonville, SC (US); Klaus Bruecklmeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 975 days.

(21) Appl. No.: 11/452,398

(22) Filed: Jun. 14, 2006

(65) Prior Publication Data

US 2006/0285957 A1 Dec. 21, 2006

(30) Foreign Application Priority Data

Jun. 15, 2005 (DE) .................. 10 2005 027 510

(51) Int. Cl.
*B60P 1/00* (2006.01)

(52) U.S. Cl. .................. 414/522; 414/466; 224/281

(58) Field of Classification Search .................. 414/477, 414/522, 541, 542, 559, 679, 466, 467
See application file for complete search history.

(56) References Cited

U.S. PATENT DOCUMENTS

| | | | | |
|---|---|---|---|---|
| 2,391,310 A * | 12/1945 | Heller | ........................ | 414/462 |
| 2,470,314 A * | 5/1949 | Lim | ............................ | 296/26.1 |
| 2,772,041 A * | 11/1956 | Zeabari | ........................ | 224/496 |
| 2,953,287 A * | 9/1960 | Werner | ........................ | 224/496 |
| 3,216,716 A * | 11/1965 | Lunde et al. | ..................... | 49/103 |
| 4,305,695 A * | 12/1981 | Zachrich | ........................ | 414/522 |
| 4,659,140 A * | 4/1987 | Fuerst et al. | ................... | 296/223 |
| 4,678,228 A * | 7/1987 | Boots | ........................ | 296/216.03 |
| 5,218,794 A * | 6/1993 | Ehrlich | ............................ | 52/64 |
| 5,531,159 A * | 7/1996 | Stubblefield | ................... | 108/102 |
| 5,556,249 A * | 9/1996 | Heine | ........................ | 414/500 |
| 5,718,472 A * | 2/1998 | Otake et al. | ................... | 296/221 |
| 6,273,487 B1 * | 8/2001 | Schurig et al. | .............. | 296/37.14 |
| 6,419,309 B1 * | 7/2002 | Kaandorp et al. | ........ | 296/216.03 |
| 6,533,525 B2 * | 3/2003 | Haid et al. | ........................ | 414/522 |
| 2005/0002768 A1 * | 1/2005 | Nick et al. | ..................... | 414/522 |

FOREIGN PATENT DOCUMENTS

| | | |
|---|---|---|
| DE | 102 30 205 B3 | 1/2004 |
| DE | 103 17 539 A1 | 11/2004 |
| EP | 1 176 057 A2 | 1/2002 |
| JP | 2003-205787 A | 7/2003 |

* cited by examiner

*Primary Examiner* — Saul Rodriguez
*Assistant Examiner* — Glenn Myers
(74) *Attorney, Agent, or Firm* — Crowell & Moring LLP

(57) ABSTRACT

A loading floor for a cargo space of a vehicle includes a section which is fixed to the vehicle, cannot be displaced and, viewed in the driving direction, is arranged in the front in the cargo space. Another section is displaceable in the longitudinal direction of the vehicle. The two sections each extend over the entire width of the cargo space. The displaceable section is displaceable over the section fixed to the vehicle. In its most rearward position viewed in the driving direction, the displaceable section may be lowered into the cargo space so that it adjoins the section fixed to the vehicle flush with the surface.

19 Claims, 3 Drawing Sheets

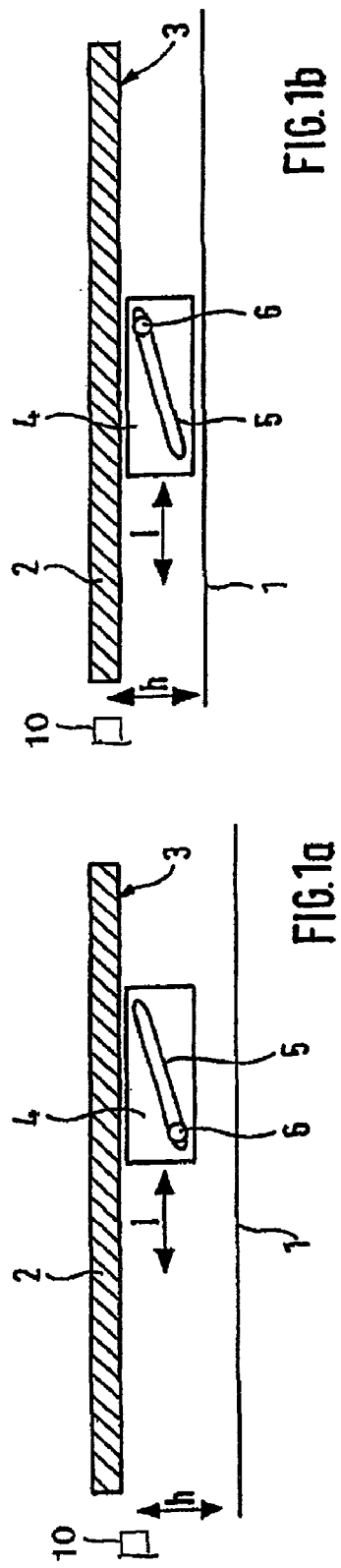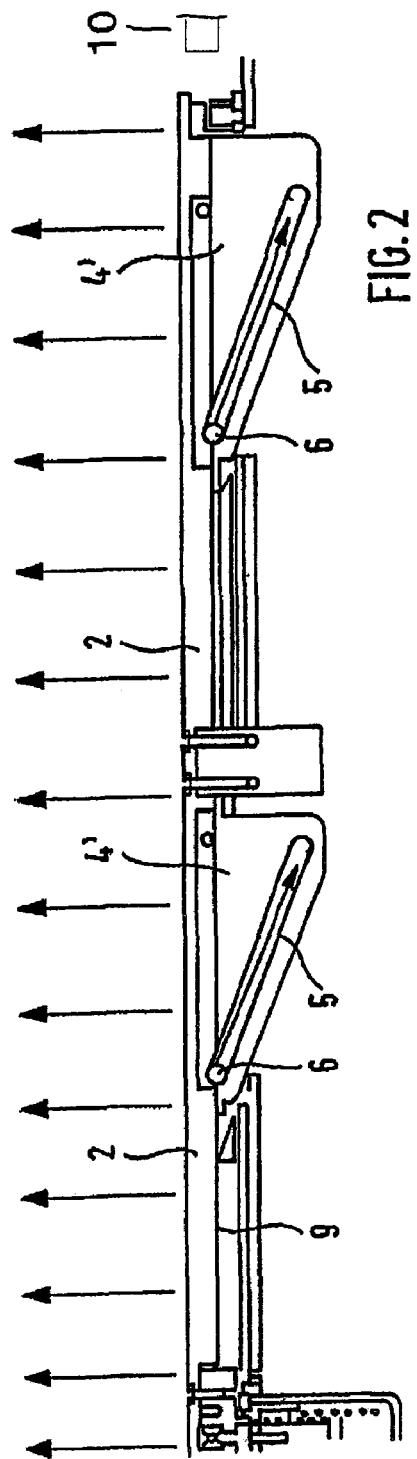

LOADING FLOOR FOR A CARGO SPACE OF A VEHICLE

BACKGROUND AND SUMMARY OF THE INVENTION

This application claims the priority of German Application No. 10 2005 027 510.9, filed Jun. 15, 2005, the disclosure of which is expressly incorporated by reference herein.

The invention relates to a loading floor for a cargo space of a vehicle, which includes a section which is fixed to the vehicle, cannot be displaced and, viewed in the driving direction, is arranged in the front in the cargo space, and also includes a section which can be displaced in the longitudinal direction of the vehicle.

A movable loading floor for a cargo space of a vehicle is known from German Patent document DE 103 17 539 A1. The vehicle has a seat arrangement which is situated in front of the cargo space and can be changed from its in-use position into a not-in-use position, and the loading floor can then be moved into the area taken up by the seat arrangement in its in-use position.

It is an object of the invention to create a loading floor for a cargo space of a vehicle, which permits a comfortable loading and unloading of the cargo space.

This object is achieved by providing a motor vehicle having a loading floor for a vehicle cargo space which includes a section which is fixed to the vehicle, cannot be displaced and, viewed in the driving direction, is arranged in the front in the cargo space, and also includes a section which can be displaced in the longitudinal direction of the vehicle. The two sections each extend over the entire width of the cargo space, with the displaceable section being displaceable over the section fixed to the vehicle. The displaceable section is lowerable, viewed in the driving direction, in its most rearward position in the cargo space, so that it adjoins the vehicle-fixed section flush with the surface.

According to the invention, a loading floor for a cargo space of a vehicle includes a section which is fixed to the vehicle, cannot be displaced and, viewed in the driving direction, is arranged in the front in the cargo space, and of a section which can be displaced in the longitudinal direction of the vehicle. The two sections each extend over the entire width of the cargo space, the displaceable section being displaceable over the section fixed to the vehicle. In its most rearward position—viewed in the driving direction—, the displaceable section can be lowered in the cargo space, so that it adjoins the section fixed to the vehicle flush with the surface.

For explaining the advantages of the invention, a passenger car constructed as a station wagon is described here, which has a large tailgate for loading the cargo space. When a heavy or large object to be transported is to be loaded, the latter is normally first deposited in the rearward area of the cargo space close to the rear opening. If the vehicle has a loading floor according to the invention, the object can be deposited on the displaceable section which is situated in the rearward position. The displaceable section (with the object deposited thereon) can now, with a low expenditure of force, be displaced toward the front, viewed in the driving direction, so that the rearward, easily accessible area of the cargo space will be free again for loading additional objects. Inversely, the object can also at any time be easily displaced together with the displaceable section back toward the loading opening, so that it can be unloaded with little effort. Nevertheless, in the case of very large objects, a loading floor is available which is flat over the entire surface of the cargo space, when the displaceable section is in the rearward lowered position. As a result, there is no jump in height between the section fixed to the vehicle and the displaceable section, so that the loading and unloading of large objects extending over both sections is not made difficult. The arrangement according to the invention, therefore, permits a comfortable loading and unloading of the cargo space.

Preferably, a locking mechanism prevents the displaceable section from being displaced in the driving direction when it is in a completely or partially lowered position. In this manner, it is ensured that the displaceable section cannot collide with the section fixed to the vehicle. This also ensures that, in the event of an accident, the displaceable section cannot undesirably shift toward the front on its own.

A particularly advantageous further development of the lowering and lifting mechanism consists of the fact that at least one carriage is guided on the displaceable section, which carriage has a guideway sloped in the lifting direction for a pin fixed to the vehicle in the cargo space, so that, by displacement of the carriage on the displaceable section, the latter is lowered or lifted. The displacement of the carriage may take place by a cable control which, in turn, may be operable by an operating element mounted on the displaceable section.

Other objects, advantages and novel features of the present invention will become apparent from the following detailed description of the invention when considered in conjunction with the accompanying drawings.

BRIEF DESCRIPTION OF THE DRAWINGS

FIG. 1a is a schematic diagram of a lowering mechanism for a displaceable section of a loading floor in its lifted position;

FIG. 1b is a schematic diagram of the lowering mechanism of FIG. 1 with the displaceable section of the loading floor in a lowered position;

FIG. 2 is a longitudinal sectional view in the longitudinal direction of the vehicle of the loading floor in the area of a lateral guide;

DETAILED DESCRIPTION OF THE DRAWINGS

Figure 3:
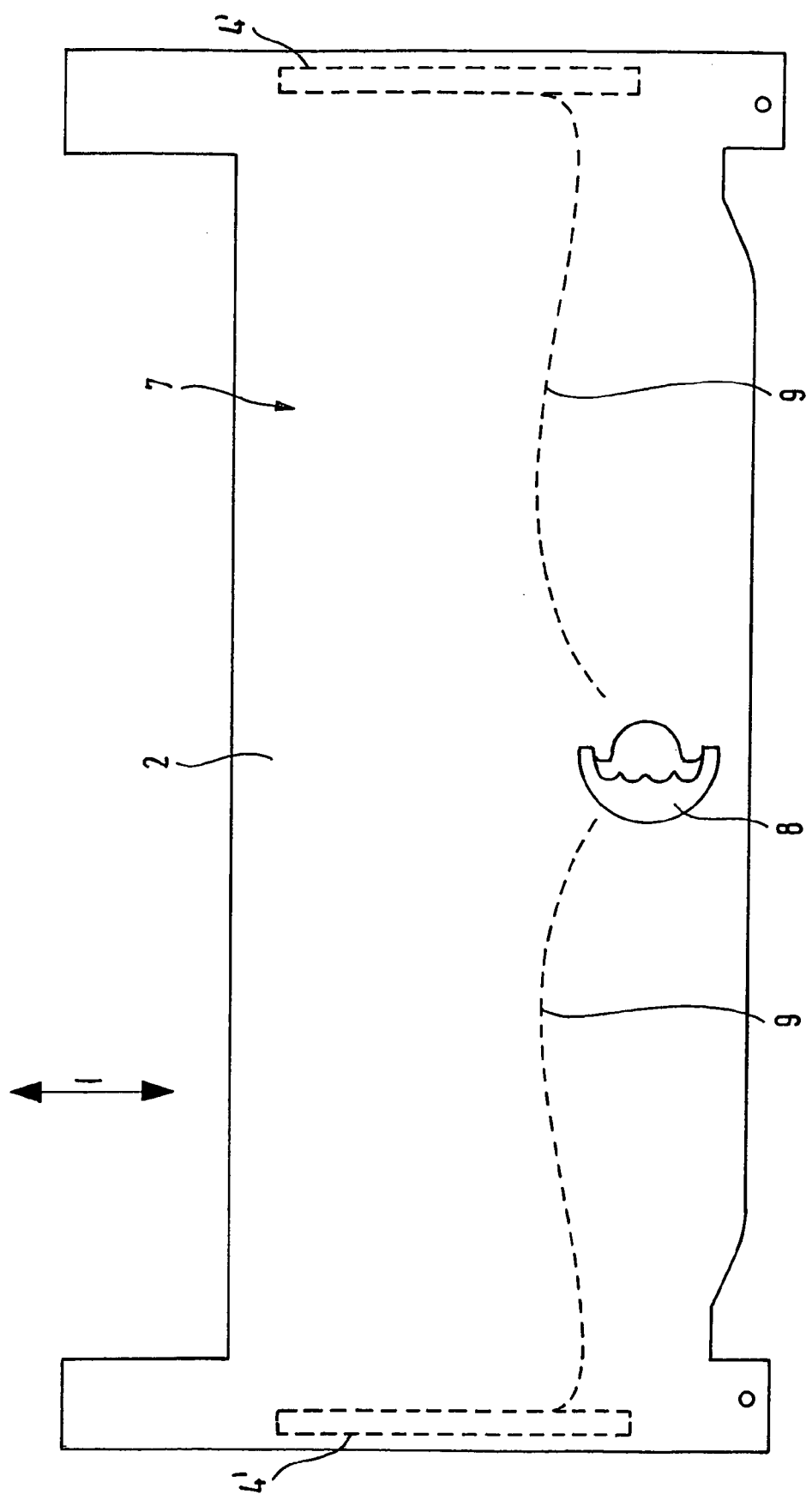
FIG. 3 is a top view of the displaceable section of the loading floor with an operating element.

FIGS. 1a and 1b illustrate a large cargo space 1 of a passenger car constructed as a station wagon. The cargo space 1 is accessible from the rear, viewed in the driving direction of the vehicle, through a rear opening (which is not shown) and can be closed by a tailgate. On the bottom of the cargo space 1, a loading floor is situated on which objects can be deposited. The loading floor consists of a forward section 10 (partially shown in FIGS. 1a and 1b) fixedly connected with the cargo space 1, as well as of a rearward section 2, which can be displaced in the longitudinal direction of the vehicle. The two sections each extend at least approximately over the entire width of the cargo space 1. The displaceable section 2 may be pushed over the forward section fixed to the vehicle. In its rearward position, the displaceable section 2 can be lowered, so that it adjoins the rearward edge of the forward section fixed to the vehicle flush with the surface. In this position, the two sections form a continuous flat loading surface.

When heavy objects are to be loaded now, they are normally first deposited in the cargo space close to the loading opening. In the case of the embodiment described here, the objects may be placed on the displaceable section 2 in its rearward position. Subsequently, they can be pushed forward together with the displaceable section 2 at a low expenditure of force over the forward section fixed to the vehicle. As a result, the rearward area of the cargo space close to the loading opening will be free again for additional objects to be loaded.

Inversely, the objects on the displaceable section 2 can be pulled toward the rear of the vehicle again with low expenditures, so that a comfortable unloading is ensured. Without the displaceable section 2, the objects would have to be pushed toward the front on the loading floor with a comparatively high expenditure of force and would have to be pulled to the rear toward the loading opening again for the unloading. When, in contrast, a very large object has to be transported, no jump in height between the two sections will hinder the loading and unloading because the displaceable section can be lowered, so that it adjoins the forward section flush with the surface. The displaceable section, therefore, increases the comfort during the loading and unloading of the cargo space.

For the lowering and, inversely, for the lifting of the displaceable section 2, one carriage 4 respectively is mounted on the underside 3 of the displaceable section 2 on the sides, which carriage 4 may be displaced in the longitudinal direction 1 on the underside 3. Both carriages 4 have a guideway 5 extending in the lifting direction h and in the longitudinal direction 1 of the vehicle. In the guideway, a pin 6 is guided, which pin is fixedly mounted on the vehicle in the cargo space.

When the carriage 4 is now displaced in the longitudinal direction 1 of the vehicle without a displacement of the displaceable section in the longitudinal direction 1 of the vehicle, depending on the direction of the displacement of the carriage 4, the displaceable section 2 is lowered or lifted.

FIG. 2 is a sectional view of the displaceable section 2 in the area of a carriage 4' in the longitudinal direction of the vehicle. The carriage 4' has a forward and a rearward guideway 5. The displaceable section 2 is illustrated in the lowered position. Correspondingly, the pins 6 guided in the guideways 5 and fixed to the vehicle are in each case situated at the left end of the guideway 5. When, in the illustrated sectional view, the carriage 4' with the two guideways 5 is displaced toward the left, the carriage 4' and thereby the displaceable section 2 moves upward.

Figure 4:
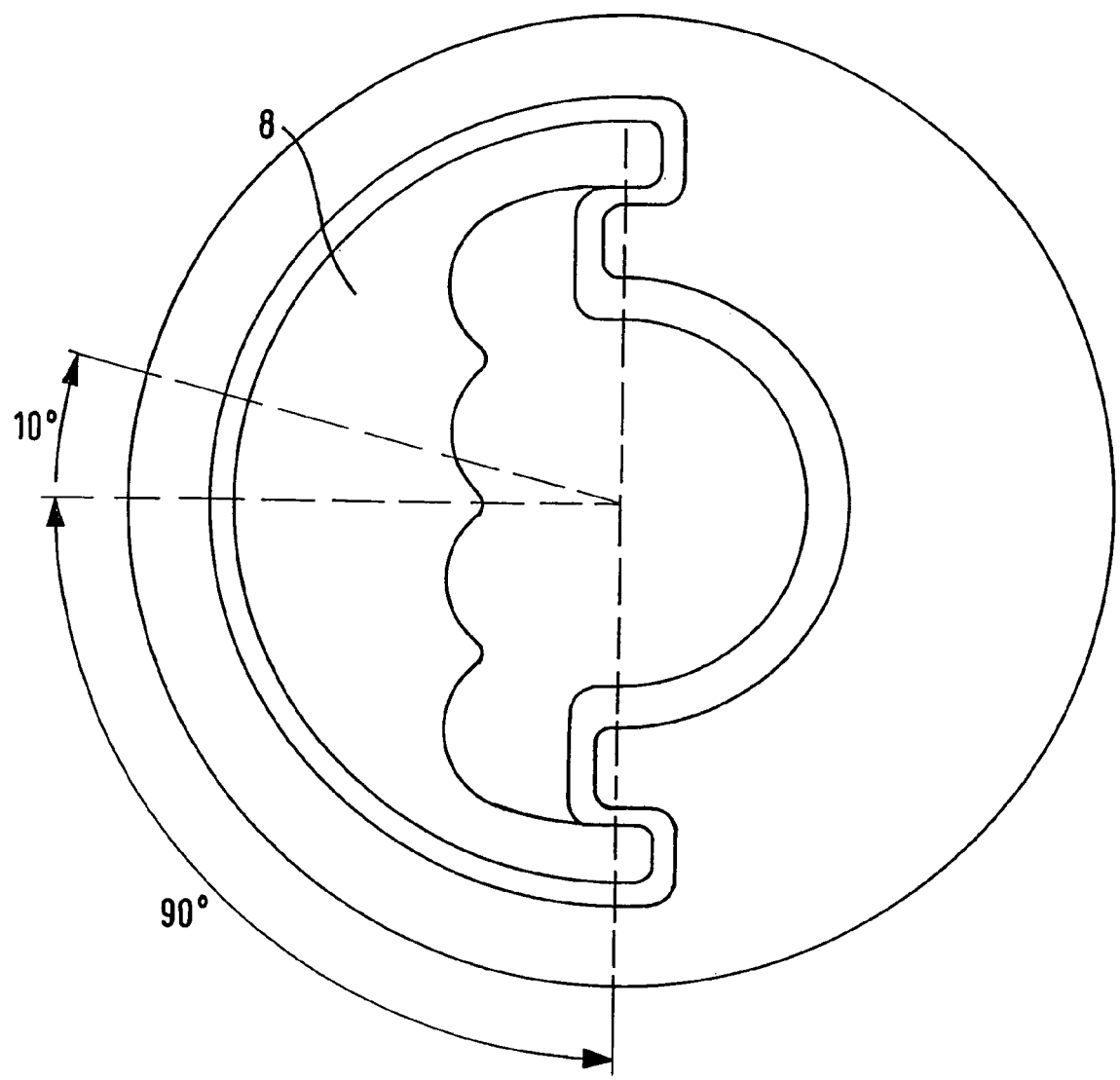
FIG. 4 is an enlarged top view of the operating element.

The displacement of the carriage 4, 4' can take place by way of a cable control 9. The cable control 9, in turn, may be operated manually by way of a grip. FIG. 3 illustrates a displaceable section 2 on whose underside one carriage 4' respectively, is guided on the left and on the right edge of the cargo space. In the area of the displaceable section 2 facing the loading opening, a rotatable grip 8 is recessed on the top side 7. When the grip 8 is rotated, two cable controls 9 are operated simultaneously. One cable control 9 acts upon the carriage 4' on the left edge of the displaceable section 2; the other cable control 9 acts upon the carriage 4' on the right edge. Thus, when the grip 8 is operated, the displaceable section 2 is simultaneously lifted or lowered on the left and the right. FIG. 4 is an enlarged view of the grip 8. The lifting or lowering of the displaceable section 2 takes place by rotating the grip 8 by 90 degrees clockwise or counterclockwise.

During the lifting or lowering of the displaceable section 2, the latter should not displace itself in the longitudinal direction 1 of the vehicle. In order to ensure this, a locking mechanism is provided, which locks the displaceable section 2 in its most rearward position in which it can be lowered. In the lifted position of the displaceable section 2, the locking mechanism must correspondingly be released first before the displaceable section 2 can be displaced forward from its most rearward position. For this purpose, the locking mechanism is designed such that it can be operated by the carriage 4'. The carriage 4' may be displaced even more by way of the cable control 9, although the displaceable section 2 is already in the lifted position. When the carriage 4' is displaced more, it presses on an operating element of the locking mechanism, so that the latter opens up, and the displaceable section 2 can be displaced toward the front. Correspondingly, the grip has to be rotated beyond the 90 degree rotation for lifting the displaceable section 2 by another 10 degrees, so that the carriage 4' presses upon the operating element of the locking mechanism and thus opens the latter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A loading floor for an enclosed cargo space of a vehicle located rearwardly of vehicle passenger seats, the loading floor comprising:
    a fixed first section located below the enclosed cargo space and adjacent the vehicle passenger seats so as to be, as viewed from a rearmost position toward a front end of the vehicle, arranged in a forwardmost position of the enclosed cargo space; and
    a second section located below the enclosed cargo space displaceable in a longitudinal rearward direction of the vehicle, each of the fixed first section and the second section extending over substantially an entire width of the cargo space floor located below the enclosed cargo space, the second section being displaceable over the fixed first section such that a lower surface of the second section moves into the enclosed cargo space always to remain parallel to an upper surface of the fixed first section during displacement movement to a loading position where the second section is oriented parallel to and spaced from the fixed first section,
    wherein in a most rearward position in the enclosed cargo space viewed in the forward driving direction, the second section is lowerable without longitudinal displacement so as to adjoin the fixed first section and to have an upper surface thereof flush with the upper surface of the fixed first section.

2. The loading floor according to claim 1, wherein the second section is prevented from being displaced forward in the longitudinal direction of the vehicle when in at least a partially lowered position.

3. The loading floor according to claim 1, further comprising:
    at least one carriage guided on the second section, which carriage includes a guideway sloped in a lifting direction for interaction with a pin mounted in the cargo space and fixable to the vehicle; and
    wherein, by displacement of the carriage, the second section is liftable or lowerable.

4. The loading floor according to claim 2, further comprising:
    at least one carriage guided on the second section, which carriage includes a guideway sloped in a lifting direction for interaction with a pin mounted in the cargo space and fixable to the vehicle; and
    wherein, by displacement of the carriage, the second section is liftable or lowerable.

5. The loading floor according to claim 3, further comprising a cable control operatively configured to displace the carriage.

6. The loading floor according to claim 4, further comprising a cable control operatively configured to displace the carriage.

7. The loading floor according to claim 5, further comprising an operating element coupled to the cable control, which operating element is mounted on the second section.

8. The loading floor according to claim 3, wherein the second section has at least one carriage respectively arranged on each side of the second section for lowering or lifting.

9. The loading floor according to claim 5, wherein the second section has at least one carriage respectively arranged on each side of the second section for lowering or lifting.

10. The loading floor according to claim 7, wherein the second section has at least one carriage respectively arranged on each side of the second section for lowering or lifting.

11. The loading floor according to claim 8, further comprising:
a cable control operatively configured with the carriages; and
an operating element operatively coupled to the cable control, wherein the operating element acts to simultaneously displace the carriages by way of the cable control.

12. The loading floor according to claim 9, further comprising:
an operating element operatively coupled to the cable control, wherein the operating element acts to simultaneously displace the carriages by way of the cable control.

13. The loading floor according to claim 10, wherein the cable control is operatively configured with the carriages; and
wherein the operating element is operatively coupled to the cable control, wherein the operating element acts to simultaneously displace the carriages by way of the cable control.

14. The loading floor according to claim 7, wherein the operating element is operatively associated with the second section so that the second section is prevented from being displaced in the longitudinal direction of the vehicle when in an at least partially lowered position.

15. The loading floor according to claim 8, wherein the operating element is operatively associated with the second section so that the second section is prevented from being displaced in the longitudinal direction of the vehicle when in an at least partially lowered position.

16. The loading floor according to claim 11, wherein the operating element is operatively associated with the second section so that the second section is prevented from being displaced in the longitudinal direction of the vehicle when in an at least partially lowered position.

17. A loading floor for enclosed cargo space of a vehicle located rearwardly of vehicle passenger seats, comprising:
a fixed first section located below the enclosed cargo space and adjacent the vehicle passenger seats so as to be, as viewed from a rearmost position toward a front end of the vehicle, arranged in a forwardmost position of the enclosed cargo space;
a second section located below the enclosed cargo space and operatively configured to be displaceable in a longitudinal direction of the vehicle over the fixed section such that a lower surface of the fixed second section moves parallel to an upper surface of the first section during displacement movement to a loading position where the fixed second section is oriented parallel to and spaced from the fixed first section, each of the fixed first section and fixed second section extending over substantially an entire width of the enclosed cargo space floor; and
means for lifting and lowering the displaceable second section without longitudinal displacement when the second section is in a most rearwardmost position in the enclosed cargo space, such that in a lowered position, the second displaceable section adjoins the fixed section such that upper surfaces of the sections are arranged in a flush manner.

18. The loading floor according to claim 17, wherein displacement of the second section is prevented when in a completely or partially lowered position.

19. The loading floor according to claim 18, further comprising:
a cable control system for causing a displacement of the second section; and
an operating element operatively coupled with the cable control and a lock.

\* \* \* \* \*